United States Patent Office.

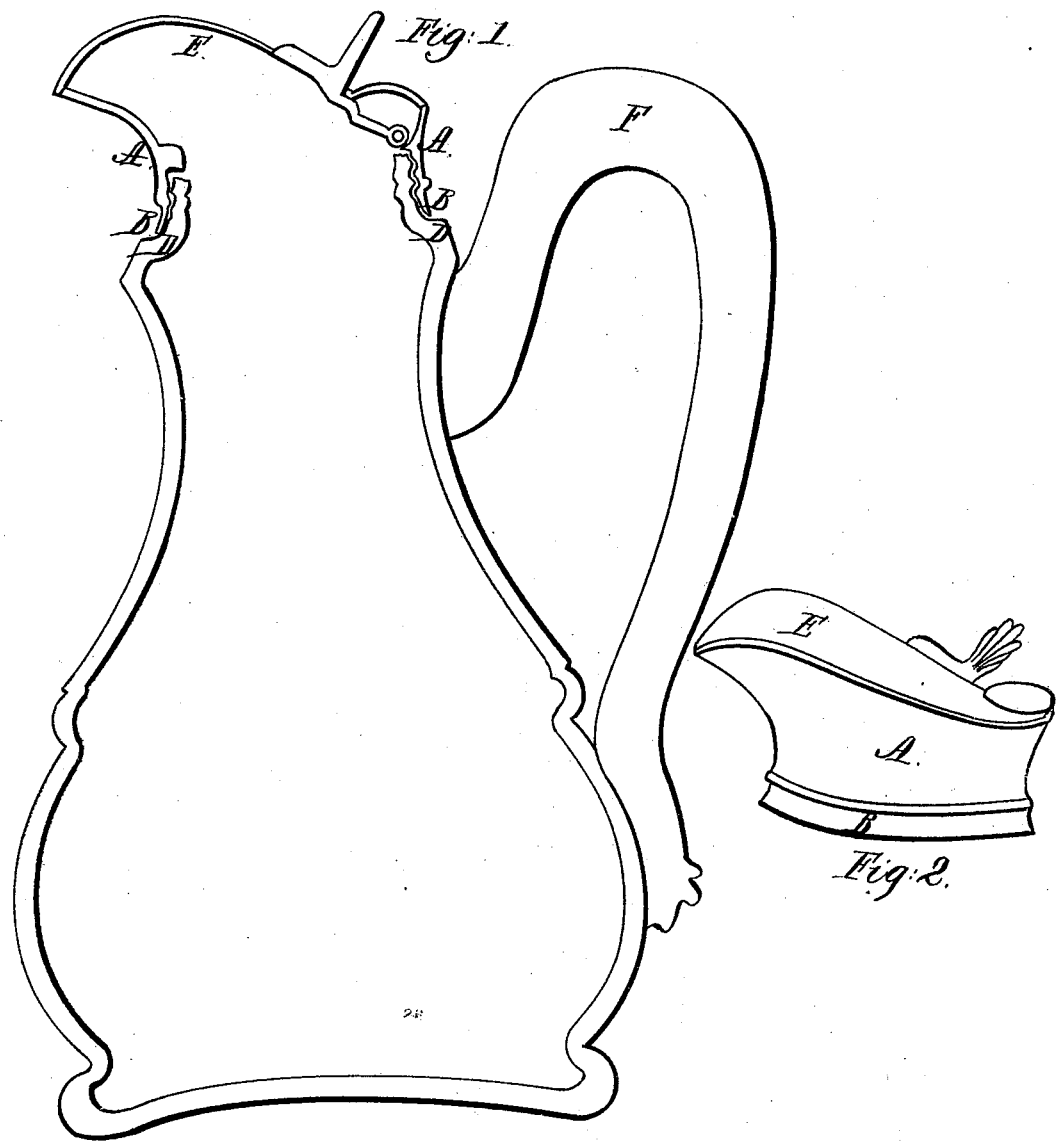

HOMER WRIGHT, OF PITTSBURG, PENNSYLVANIA, ASSIGNOR TO HIMSELF, HENRY H. COLLINS, AND BENJAMIN F. COLLINS, OF SAME PLACE.

Letters Patent No. 88,829, dated April 13, 1869.

IMPROVEMENT IN JUG-TOPS.

The Schedule referred to in these Letters Patent and making part of the same.

*To all whom it may concern:*

Be it known that I, HOMER WRIGHT, of Pittsburg, county of Allegheny, and State of of Pennsylvania, have invented a new and useful Improvement in Jug-Tops; and I do hereby declare that the following is a full and exact description thereof, reference being had to the accompanying drawings, making a part of this specification, in which—

Figure 1 is a sectional diagram of my jug-top when in proper position on the jug.

Figure 2 is a view of my jug-top when finished.

Similar letters of reference indicate corresponding parts in each figure.

This invention relates to an article of manufacture known as a jug-top, and has for its object the forming of a yielding flange on the bottom of the jug-top, so that it may be screwed to a point on a line with the handle of the jug.

To enable those skilled in the art to fully understand and construct my invention, I will proceed to describe it.

I cast my jug-top "body," A, from soft metal, (Britannia, for example,) in a metallic mould, and of the usual form, except that I cast it over a threaded core, which forms a female screw in the neck of the jug-top. This screw is of a size and diameter corresponding to a male screw on the neck of the jug, whereby the jug-top can be attached to the jug without the use of cement or plaster.

It is a well-known fact that in the blowing of screws on articles made of glass, considerable variation ensues in the fulness of the thread, owing to thickness of material, tempering, warping, or other causes occurring in the process of manufacture. Then, too, the handle must be attached at the time of manufacturing the jug, and this attachment must be made at an arbitrary point, corresponding to a given position of the screw-thread on the neck of the jug.

Owing to the variations above described, and the arbitrary position of the handle, it is obvious that the jug-top would not screw home on the neck of the jug, and be in line with the handle at the same time, except in accidental cases, the screw within the neck of the jug-top being arbitrary and unyielding, and the thread always commencing at a given point.

To overcome this difficulty, and to enable the jug-top to be screwed to a point on a line with the handle in every instance, I form a yielding flange, B, on the bottom of the neck of the jug-top, so that in case the glass screw is "shallow" blown, the jug-top will screw home, the flange resting snugly on the shoulder D of the neck of the jug, with the lid E on a line with the handle F; or, in case the glass screw is "full" blown, the jug-top will screw down, and the flange will rest on the shoulder D at a point where the lid E is not in line with the handle F, but a gentle urging of the jug-top forward will cause the flange to yield, and spread out on the shoulder of the jug until the lid comes in line with the handle.

By the use of this yielding flange, the jug-top may be made to make half a revolution on the neck, or even more, if necessary, to fetch the lid in line with the handle, after the flange has begun to rest snugly on the shoulder. This yielding flange, too, always insures a tight joint, which will prevent any leakage while in the act of pouring out the contents of the jug.

By this arrangement, it will be seen that a jug-top can be made with a screw on the inner diameter of its neck, by which it may be screwed on to the neck of a jug, with a yielding flange on the bottom of the neck of the jug-top, that will allow of its being turned sufficiently to bring it in line with the handle of the jug, making a tight joint, producing a close union between the jug-top and jug, and doing away with the labor and expense of "putting on" the jug-tops with cement or plaster.

Having thus described my invention,

What I claim as new, and desire to secure by Letters Patent, is—

The yielding flange B, when used as and for the purpose described.

HOMER WRIGHT.

Witnesses:
A. S. NICHOLSON,
CHAS. H. PARK.